Patented Oct. 13, 1931

1,827,254

UNITED STATES PATENT OFFICE

WILFRED M. MURCH, OF HAMBURG, NEW YORK, ASSIGNOR TO NATIONAL ANILINE & CHEMICAL CO., INC., OF NEW YORK, N. Y., A CORPORATION OF NEW YORK

PRODUCTION OF FLAVANTHRONE

No Drawing.   Application filed October 19, 1925.   Serial No. 63,557.

This invention relates to improvements in the manufacture and production of the dyestuff known chemically as flavanthrone (also known commercially as indanthrene yellow G.).

In the manufacture and production of flavanthrone, it has been heretofore proposed to slowly add 2-amino-anthraquinone to a solution of antimony pentachloride in nitrobenzene at a temperature of about 60° to 80° C., and then boil the mixture for an hour, after which the mixture is cooled and the flavanthrone which crystallizes is separated by filtration. This method of production and isolation has the objection that the dyestuff is obtained in relatively poor yields, and is more or less impure and duller and greener than is desirable.

The improved process contemplated by the present invention overcomes or minimizes the objections mentioned above by rapidly heating 2-aminoanthraquinone in admixture with a nitrobenzene solution of antimony pentachloride to a temperature of about 145° to 160° C., maintaining this temperature for about three-quarters to one and one-half hours or so, or until the vigor of the reaction has substantially subsided, and during the course of the reaction permanently removing in any suitable manner, for example, by distillation or by a current of inert gas, or both, water and hydrogen chloride which are evolved and preventing their return to the reaction-mixture. The mixture is then further heated and maintained at a temperature of about 205° to 210° C. for about another three-quarters to one and one-half hours or so, or until the reaction is complete, the water and hydrogen chloride evolved being removed and separated from the reaction mixture as before. When the reaction is complete, the reaction mixture is promptly submitted to filtration, the flavanthrone is filtered off from the hot nitrobenzene and washed with hot nitrobenzene reaction mass, and then with warm benzene, after which it may be dried, if desired, in any suitable manner.

The invention will be further illustrated by the following specific example, but it is understood that the invention is not limited thereto. The parts are by weight.

Example: 67 parts of antimony trichloride are dissolved in 250 parts of dry nitrobenzene at 50°–60° C. and treated with 21 parts of dry chlorine at such a rate that it is substantially all absorbed to form a solution containing 88 parts of antimony pentachloride. To the well-stirred nitrobenzene solution of antimony pentachloride at a temperature of about 50°–70° C., there is added 25 parts of 2-aminoanthraquinone (100 percent basis) and the mixture is then rapidly heated to about 155°–160° C., the apparatus in which the reaction is carried out being connected with a condenser so arranged that the water and hydrogen chloride which are formed and which volatize during the reaction are separated and removed from the reaction mixture, together with a small amount of nitrobenzene which is vaporized. The removal of the water and hydrogen chloride is assisted by passing a gentle current of air over the surface of the reaction mixture during the process. After maintaining the mixture at a temperature of 155°–160° C. for about an hour, or until the reaction at this temperature is practically completed as indicated by no further substantial evolution of water or hydrogen chloride, it is then heated to about 210° C. and maintained at this temperature for about an hour, the water and hydrogen chloride which are evolved being separated from the reaction-mass as before. The mass is then cooled to about 110°–115° C. and filtered from the separated flavanthrone, which is washed first with hot nitrobenzene (about 110°–115° C.) and then with warm benzene (about 40°–50° C.). It is then dried in a vacuum or in any other suitable manner. The flavanthrone as thus produced is obtained in yields of about 10 to 40 percent greater than those obtained by heretofore proposed processes and the product is of a superior quality or purity.

In the above example, it will be noted that the reaction-mixture is first heated and maintained at a temperature, about 160° C., suitable for the formation of a flavanthrone salt with antimony pentachloride which goes into solution. After this salt is formed, the reaction mass is then further heated to a higher temperature, about 210° C., to effect the decomposition of the salt with formation of flavanthrone which separates out, it being insoluble, or nearly so, in hot nitrobenzene. In filtering off the flavanthrone from the hot nitrobenzene reaction mass, a purification is effected since the impurities remain mostly in solution in the hot nitrobenzene.

In carrying out the invention, it is important that as much as possible of the water and hydrogen chloride formed during the reaction be removed from the field of action at all stages of the process, particularly during the formation of the flavanthrone antimony pentachloride double salt, that is, at about 160° C. or below, and be not permitted to return by reflux or otherwise to the reaction-mixture, otherwise the yields of flavanthrone will be materially lessened and the quality of the dye injured. It is further important that the final temperature does not exceed about 210° C., which is below the actual boiling point of the mixture, otherwise the product will be less pure and also difficult to filter and wash.

The flavanthrone antimony pentachloride salt decomposes quite rapidly at about 200° C. and the temperature around this point should be carefully raised to prevent a too vigorous reaction. The filtration of the flavanthrone should be promptly made from the hot solution or the purity of the dye is apt to be affected.

It may be further pointed out that a modification of the invention which comprises heating 2-aminoanthraquinone in admixture with a nitrobenzene solution of antimony pentachloride to a temperature of about 210° C. without maintaining the mixture for any suitable period of time at the intermediate temperature of about 145° to 160° C., but during which operation, however, the water and hydrogen chloride are eliminated and removed from the field of action, produces fairly good results. Nevertheless, the results so obtained are not as favorable as those obtained by the invention when carried out as illustrated in the example where the step of holding the mixture at the intermediate temperature is employed.

It is understood that the details in this process can be varied considerably without departing from the spirit or scope of the invention. For example, an impure 2-aminoanthraquinone may be used, particularly if the impurities are of a character which produce very little or no effect on the quality of the flavanthrone produced; the proportions of nitrobenzene and of antimony pentachloride, the time of heating and cooling, etc., can be varied. The flavanthrone may be filtered from the nitrobenzene at or around 200° to 210° C. or at temperatures between or as low as about 90° to 100° C.

I claim:

1. In the production of flavanthrone by a process which comprises heating 2-aminoanthraquinone with antimony pentachloride in the presence of nitrobenzene, the improvement which comprises permanently removing from the sphere of the reaction the water and hydrogen chloride evolved during the course of the reaction.

2. In the production of flavanthrone by a process which comprises heating 2-aminoanthraquinone with antimony pentachloride in the presence of nitrobenzene, the improvement which comprises heating the reaction mixture at a temperature of about 205° to 210° C., and during the course of said heating operations permanently removing from the sphere of the reaction the water and hydrogen chloride evolved.

3. In the production of flavanthrone by a process which comprises heating 2-aminoanthraquinone with antimony pentachloride in the presence of nitrobenzene, the improvement which comprises heating the reaction mixture to a temperature not higher than about 210° C., and permanently removing from the sphere of the reaction the water and hydrogen chloride evolved during the course of the operation.

4. In the production of flavanthrone by a process which comprises heating 2-aminoanthraquinone with antimony pentachloride in the presence of nitrobenzene at a temperature of about 145° to 160° C., the improvement which comprises permanently removing from the sphere of the reaction the water and hydrogen chloride evolved during the course of the reaction.

5. In the production of flavanthrone by heating 2-aminoanthraquinone with antimony pentachloride in the presence of nitrobenzene at a temperature of about 145° to 160° C., the improvement which comprises heating the reaction mixture containing a flavanthrone antimony pentachloride salt and nitrobenzene at a temperature not to exceed about 210° C., whereby flavanthrone is produced, and removing from the sphere of the reaction the water vapor and hydrogen chloride evolved during the course of the reaction.

6. In the production of flavanthrone, a process which comprises heating 2-aminoanthraquinone with antimony pentachloride in the presence of nitrobenzene to a temperature of about 145°–160° C., removing from the sphere of action the water and hydrogen chloride evolved during the force of the reaction, maintaining this temperature until the evolution of water and hydrogen chloride has practically ceased, then further heating the mixture and maintaining the temperature at about 205°–210° C. until the formation of flavanthrone is substantially complete.

7. In the production of flavanthrone by heating 2-aminoanthraquinone with antimony pentachloride in the presence of nitrobenzene, the improvement which comprises the employment in the course of the reaction of a current of inert gas to assist in the permanent removal of the water and hydrogen chloride formed in the reaction.

8. In the production of flavanthrone by a process which comprises heating 2-aminoanthraquinone with antimony pentachloride in the presence of nitrobenzene, the improvement which comprises heating the reaction mixture at a temperature not exceeding about 210° C., and permanently removing from the sphere of the reaction the water vapor and hydrogen chloride evolved during the course of the operation by means of a current of inert gas.

9. In the production of flavanthrone by a process which comprises heating 2-aminoanthraquinone with antimony pentachloride in the presence of nitrobenzene, the improvement which comprises heating the reaction mixture at a temperature not exceeding about 210° C., and permanently removing from the sphere of the reaction the water vapor and hydrogen chloride evolved during the course of the operation by passing a current of air over the surface of the reaction mixture.

10. In a process according to claim 2 the further improvement of passing a current of air over the surface of the reaction mixture to assist in the removal of the water vapor and hydrogen chloride.

11. In the production of flavanthrone by heating 2-aminoanthraquinone with antimony pentachloride in the presence of nitrobenzene, the improvement which comprises heating the mixture and maintaining it at a temperature not to exceed about 160° C. until the formation of the flavanthrone antimony pentachloride salt is practically complete and during the course of the reaction removing with the aid of a current of air the water vapor and hydrogen chloride evolved.

12. In the production of flavanthrone by heating 2-aminoanthraquinone with antimony pentachloride in the presence of nitrobenzene, the process which comprises completing the reaction to form flavanthrone and then separating the precipitated flavanthrone from the nitrobenzene at a temperature of about 90°–120° C.

13. In the production of flavanthrone by heating 2-aminoanthraquinone with antimony pentachloride in the presence of nitrobenzene, the process which comprises completing the reaction to form flavanthrone and then separating the precipitated flavanthrone from the nitrobenzene at a temperature of about 110°–115° C.

14. In the production of flavanthrone by heating 2-aminoanthraquinone with antimony pentachloride in the presence of nitrobenzene, the process which comprises completing the reaction to form flavanthrone and then promptly separating the precipitated flavanthrone from the nitrobenzene at a temperature of about 90° to 120° C.

15. In the production of flavanthrone, a process which comprises mixing 2-aminoanthraquinone with antimony pentachloride in the presence of nitrobenzene at a temperature of about 50° to 70° C., rapidly heating the mixture to a temperature of about 155° to 160° C. and maintaining this temperature for about an hour, then further heating and maintaining the mixture at a temperature of about 210° C. for about another hour, permanently removing from the sphere of the reaction the water vapor and hydrogen chloride evolved during the course of said heating operations, cooling the reaction mixture to about 110° to 115° C., and filtering off the flavanthrone.

16. In the production of flavanthrone, a process which comprises mixing 2-aminoanthraquinone with antimony pentachloride in the presence of nitrobenzene at a temperature of about 50° to 70° C., rapidly heating the mixture to a temperature of about 155° to 160° C. and maintaining this temperature for about an hour, then further heating and maintaining the mixture at a temperature of about 210° C. for about another hour, passing a current of air over the surface of the reaction mixture throughout the course of the reaction in order to assist in the permanent removal of the water vapor and hydrogen chloride evolved, then cooling the reaction mixture to about 110° to 115° C., and promptly submitting said mixture to filtration to recover the flavanthrone.

In testimony whereof I affix my signature.

WILFRED M. MURCH.